(12) United States Patent
Maeda

(10) Patent No.: US 8,972,514 B2
(45) Date of Patent: Mar. 3, 2015

(54) DATA TRANSMITTING AND RECEIVING METHOD, DATA TRANSMITTING AND RECEIVING SYSTEM, MASTER DEVICE, AND SLAVE DEVICE

(75) Inventor: Yasuo Maeda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 211 days.

(21) Appl. No.: 13/132,961

(22) PCT Filed: Dec. 3, 2009

(86) PCT No.: PCT/JP2009/070326
§ 371 (c)(1),
(2), (4) Date: Jun. 6, 2011

(87) PCT Pub. No.: WO2010/067749
PCT Pub. Date: Jun. 17, 2010

(65) Prior Publication Data
US 2011/0238774 A1 Sep. 29, 2011

(30) Foreign Application Priority Data
Dec. 12, 2008 (JP) ................................. 2008-317557

(51) Int. Cl.
*G06F 15/16* (2006.01)
*H04L 12/403* (2006.01)
*H04B 3/54* (2006.01)

(52) U.S. Cl.
CPC .............. *H04L 12/4035* (2013.01); *H04B 3/54* (2013.01); *H04B 2203/5408* (2013.01)
USPC ............ 709/208; 709/209; 709/210; 709/211

(58) Field of Classification Search
None
See application file for complete search history.

(56) References Cited

U.S. PATENT DOCUMENTS

| | | | |
|---|---|---|---|
| 5,815,660 A * | 9/1998 | Momona | 709/208 |
| 6,728,231 B1 | 4/2004 | Sugaya et al. | |
| 2002/0114042 A1* | 8/2002 | Ichibangase et al. | 359/167 |

(Continued)

FOREIGN PATENT DOCUMENTS

| JP | 2-084832 A | 3/1990 |
|---|---|---|
| JP | 5-191324 A | 7/1993 |

(Continued)

OTHER PUBLICATIONS

Office Action (Reason) dated Aug. 7, 2012, issued in corresponding Japanese Patent Application No. 2010-542089 and an English Translation thereof. (7 pages).

(Continued)

*Primary Examiner* — Dhairya A Patel
(74) *Attorney, Agent, or Firm* — Buchanan Ingersoll & Rooney PC

(57) ABSTRACT

In a data transmitting and receiving method of a demand assignment type, a master device schedules an occupancy band of a fixed size for requesting a band to the master device by slave devices, with respect to a specific number of slave devices for each cycle, and the slave device waits for assignment of the occupancy band of the fixed size based on the schedule and performs message transmission of requesting a band for data transmission to the master device, thereby suppressing an influence of pressure on the data transmission band and preventing line utilization efficiency from decreasing while avoiding signal collision on a Random Channel.

48 Claims, 8 Drawing Sheets

(56) References Cited

U.S. PATENT DOCUMENTS

| | | | |
|---|---|---|---|
| 2005/0032534 A1* | 2/2005 | Yoshizawa et al. | 455/507 |
| 2005/0220117 A1* | 10/2005 | Omi et al. | 370/395.4 |
| 2010/0229037 A1* | 9/2010 | Sato et al. | 714/27 |
| 2011/0158332 A1* | 6/2011 | Wu et al. | 375/259 |

FOREIGN PATENT DOCUMENTS

| | | |
|---|---|---|
| JP | 7-312586 A | 11/1995 |
| JP | 9-018441 A | 1/1997 |
| JP | 2000-278280 A | 10/2000 |
| JP | 2000-341192 A | 12/2000 |
| JP | 2003-273881 A | 9/2003 |
| WO | 2007080833 A1 | 7/2007 |

OTHER PUBLICATIONS

International Search Report (PCT/ISA/210) for PCT/JP2009/070326 dated Feb. 23, 2010.

F. Nuno et al., "Performance Evaluation of Data Transmission Scheme using Random Access for Wide Area Ubiquitous Networks", IEICE Technical Report TCS2007-29~52, Jul. 12, 2007, pp. 113-118, vol. 107, No. 147 (with partial English translation).

Japanese version of the Office Action from Chinese Patent Office dated Jul. 1, 2013, issued in corresponding Chinese Patent Application No. 2010101510450, with English translation thereof. (50 pages).

Office Action from Chinese Patent Office issued on Mar. 5, 2014, in corresponding Chinese Patent Application No. 200980149705.7, and English translation thereof.

* cited by examiner

[FIG.1]
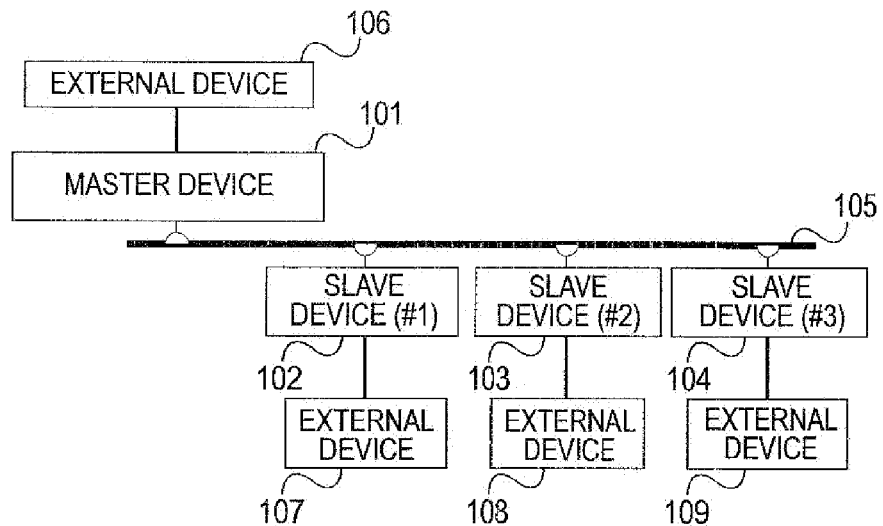
[FIG.2]
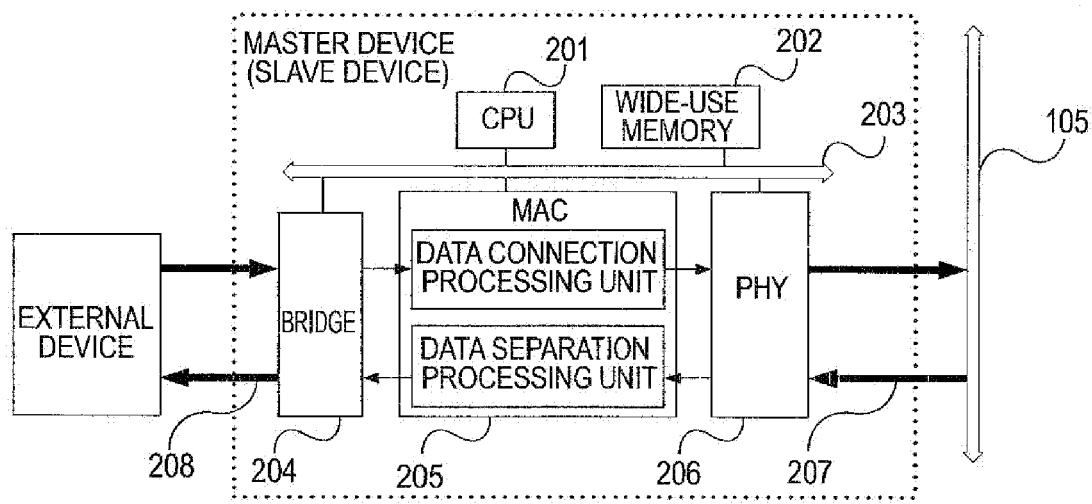
[FIG.3]
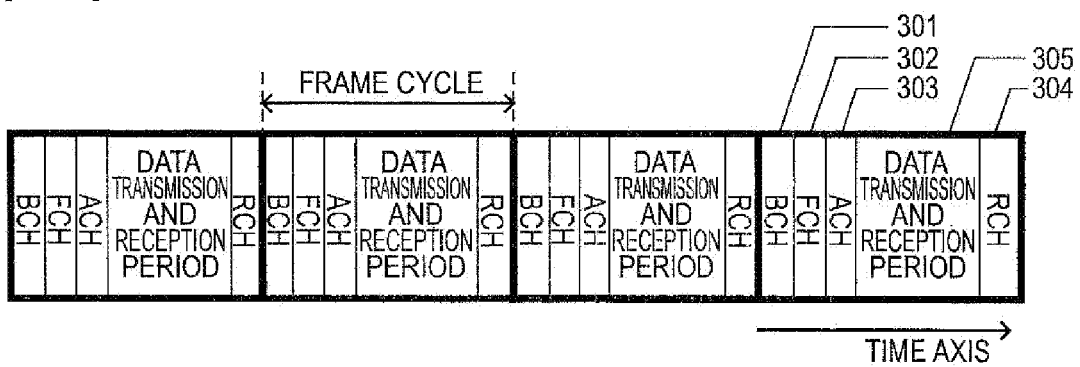

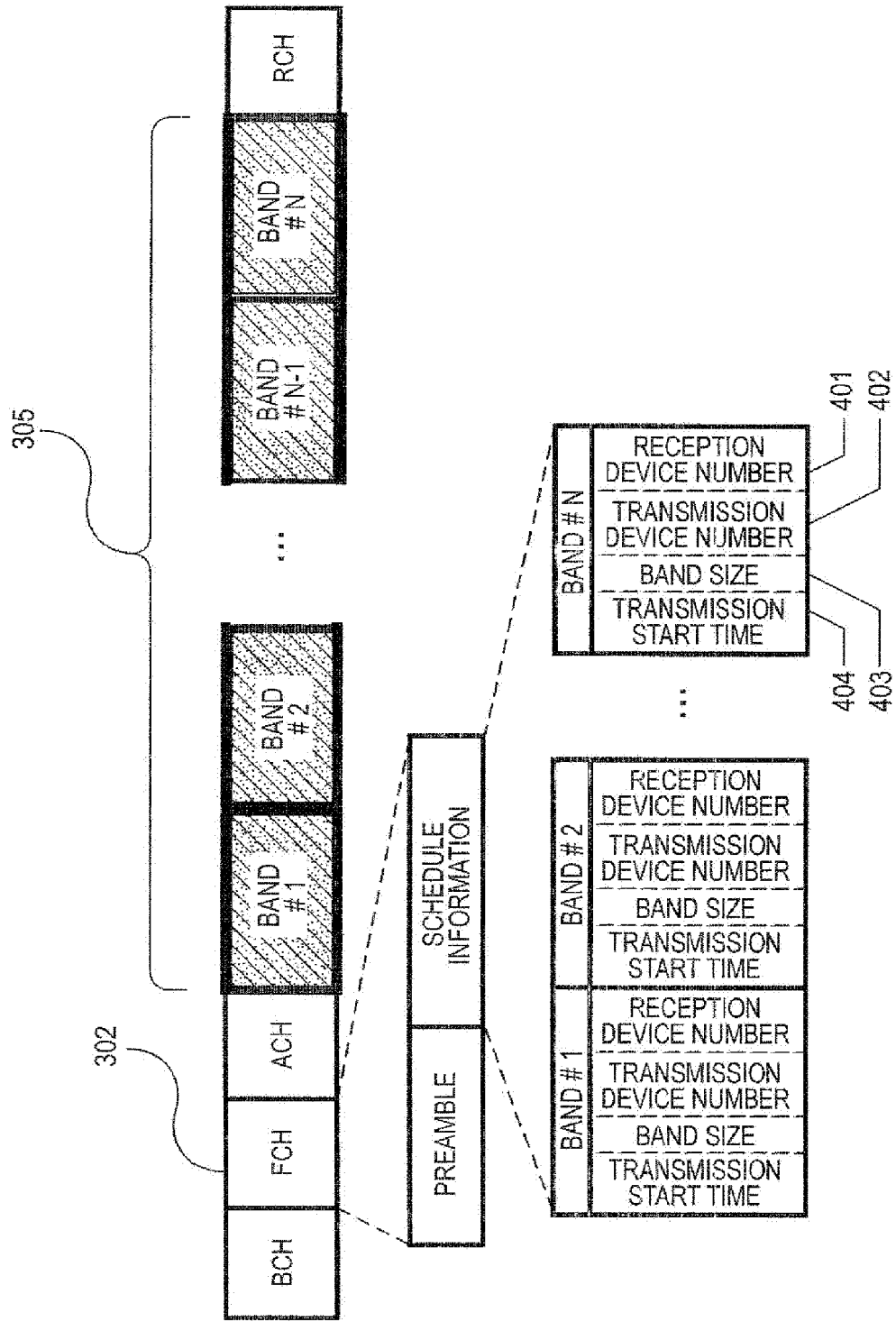
[FIG.4]

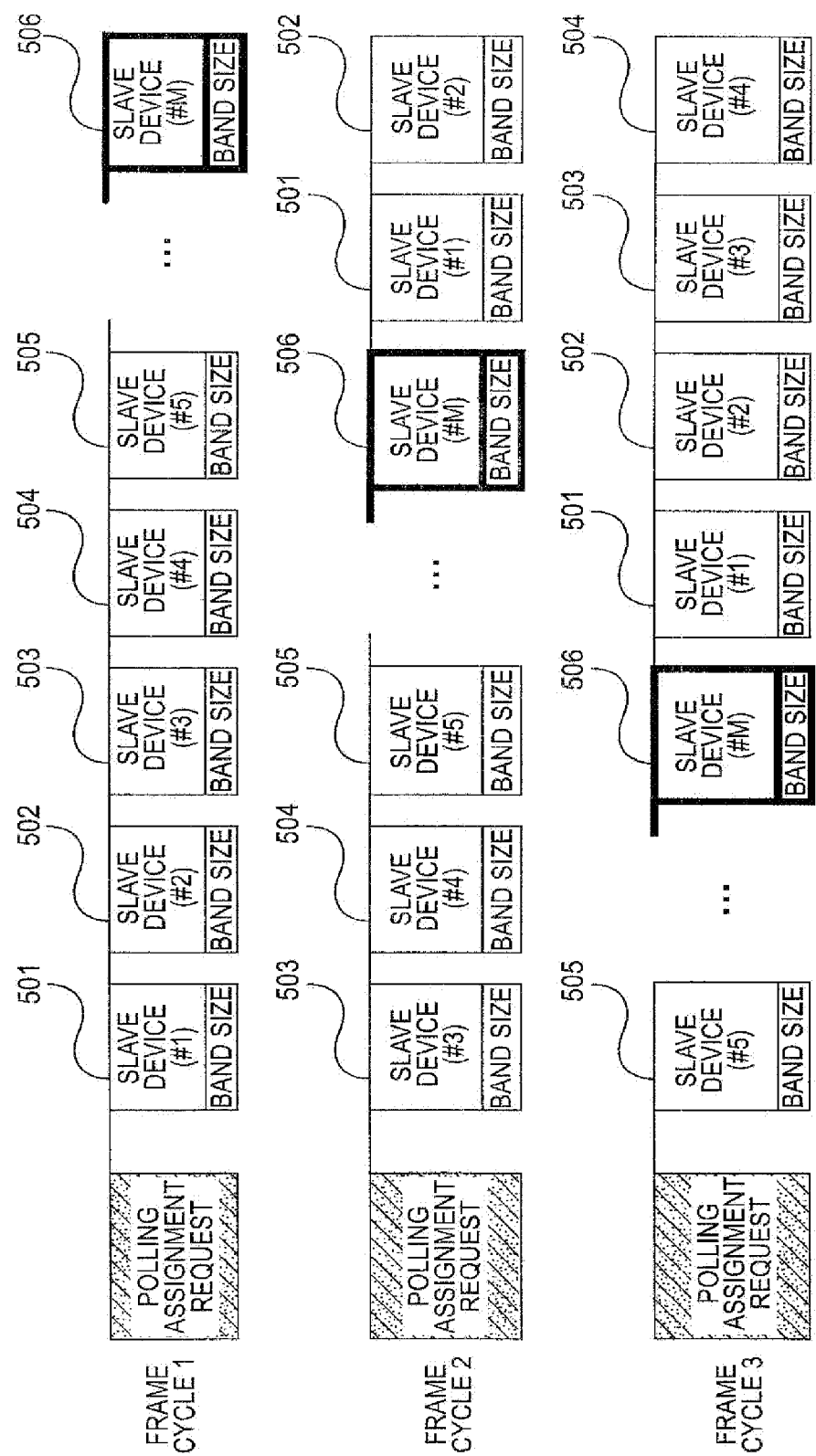

[FIG.6]
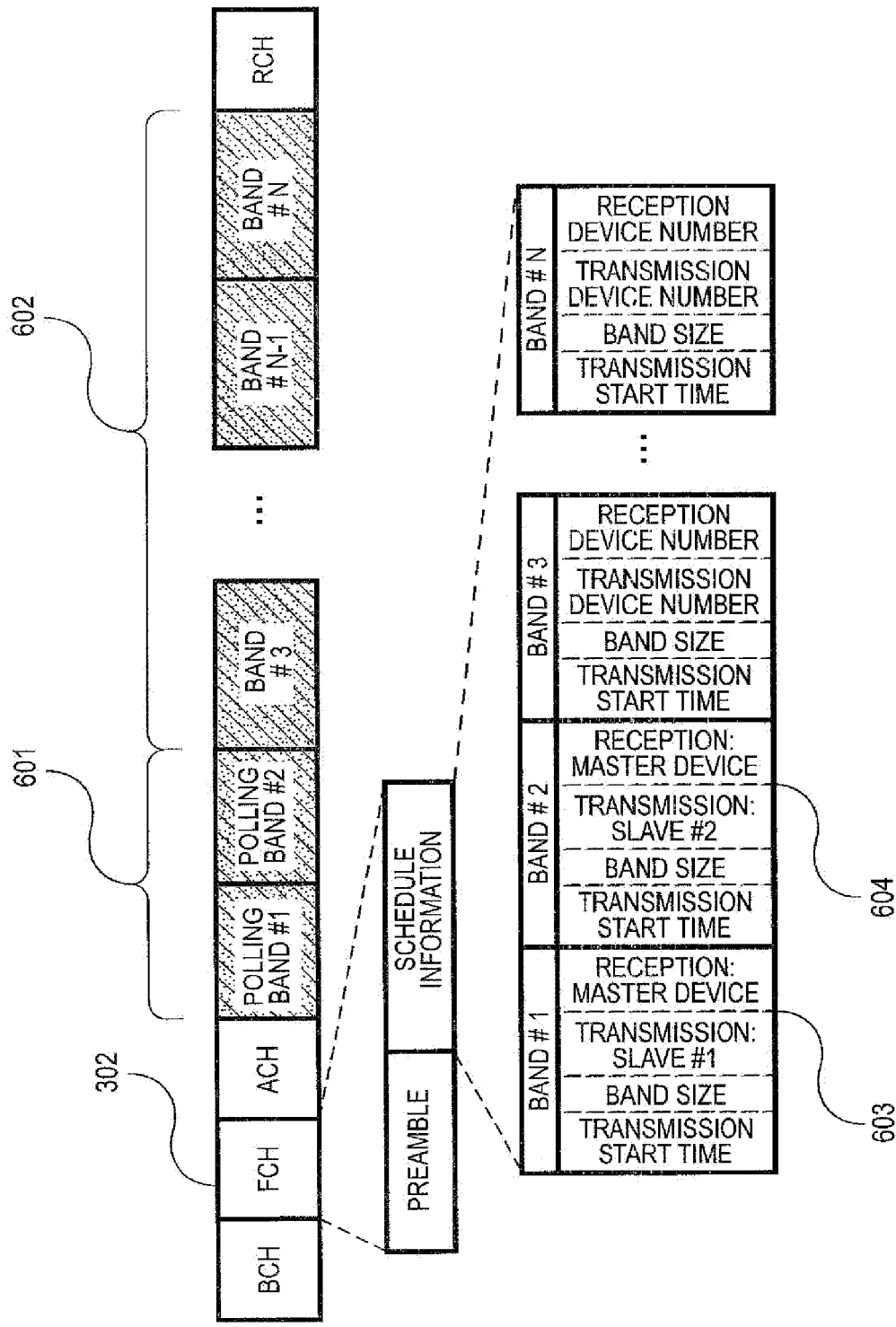

[FIG.7]
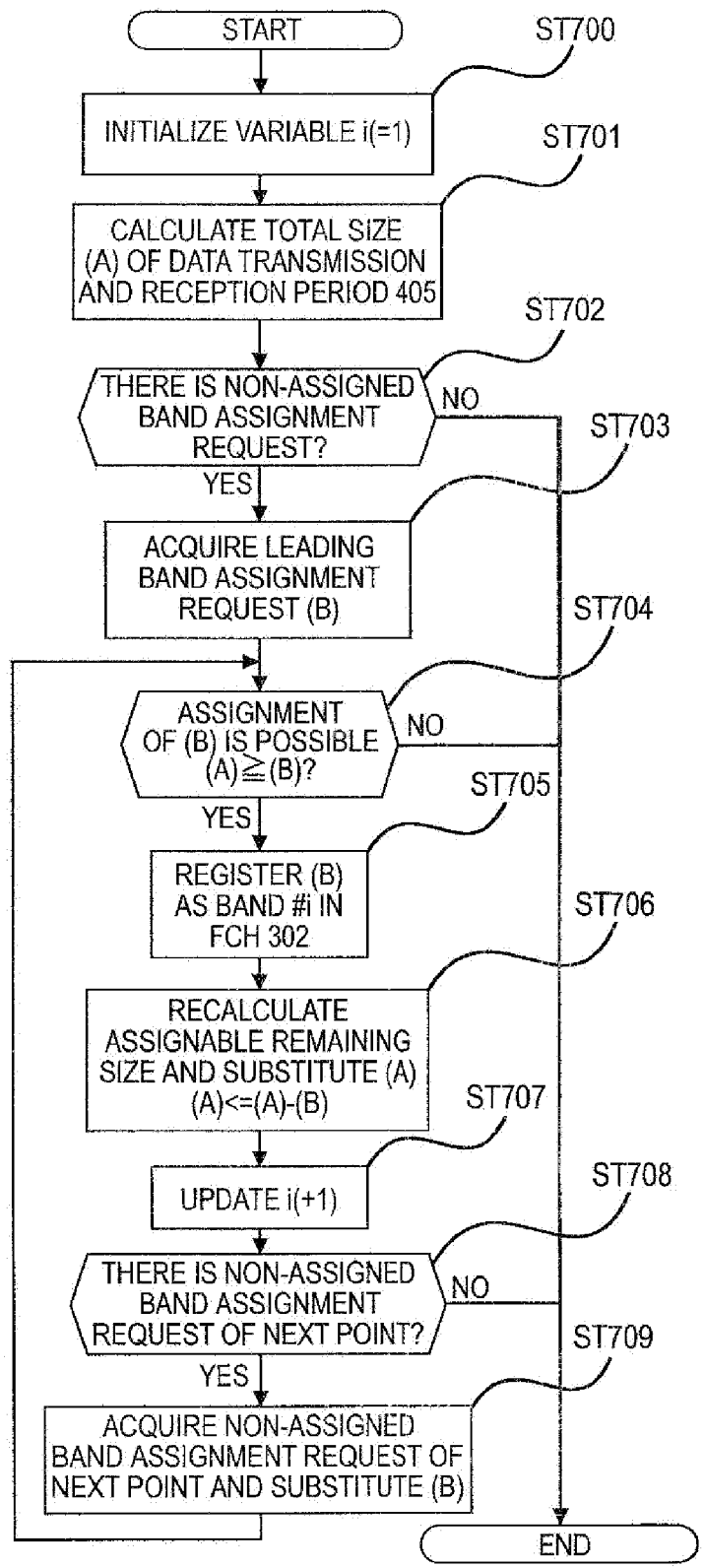

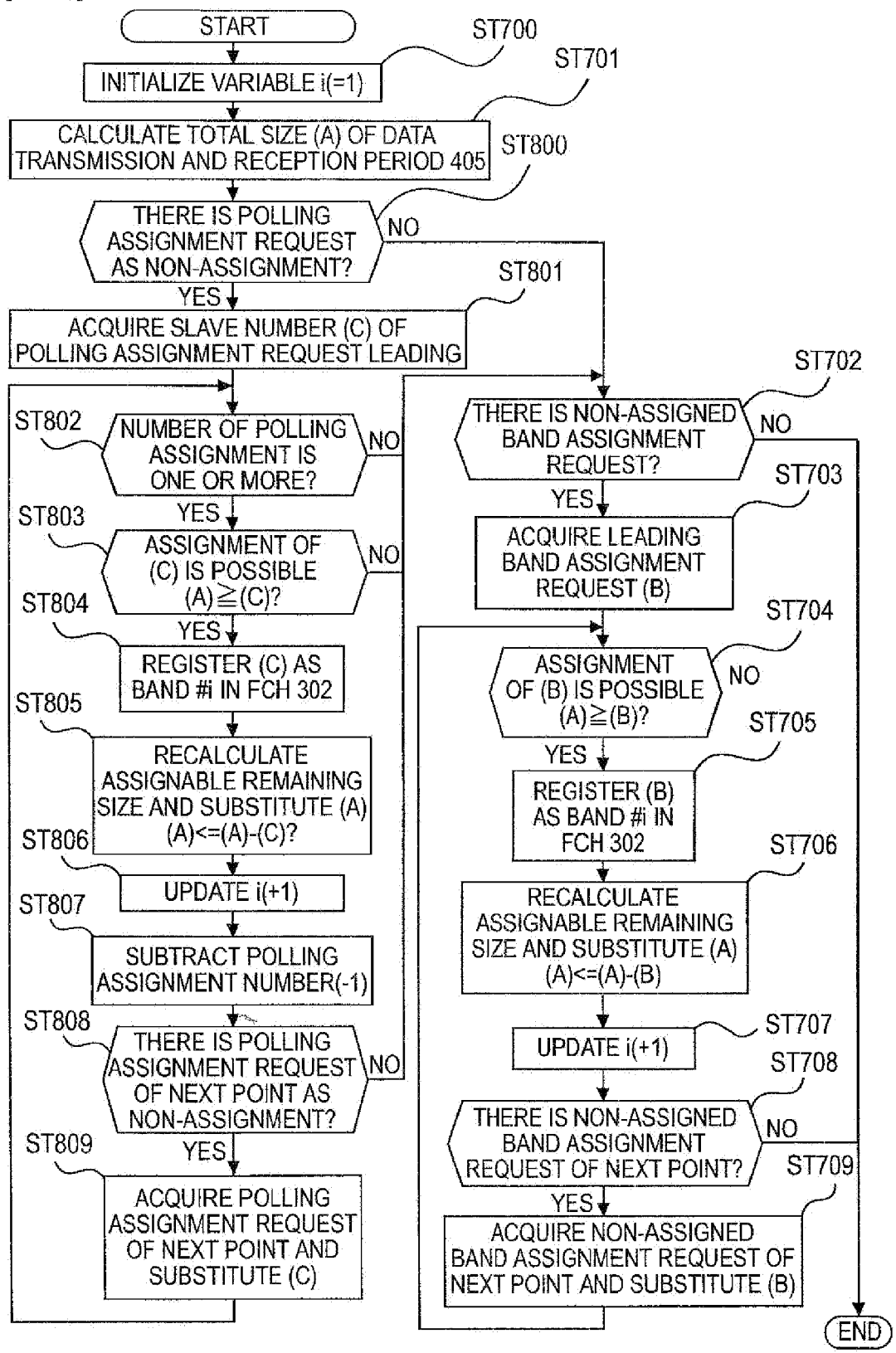
[FIG.8]

[FIG.9]
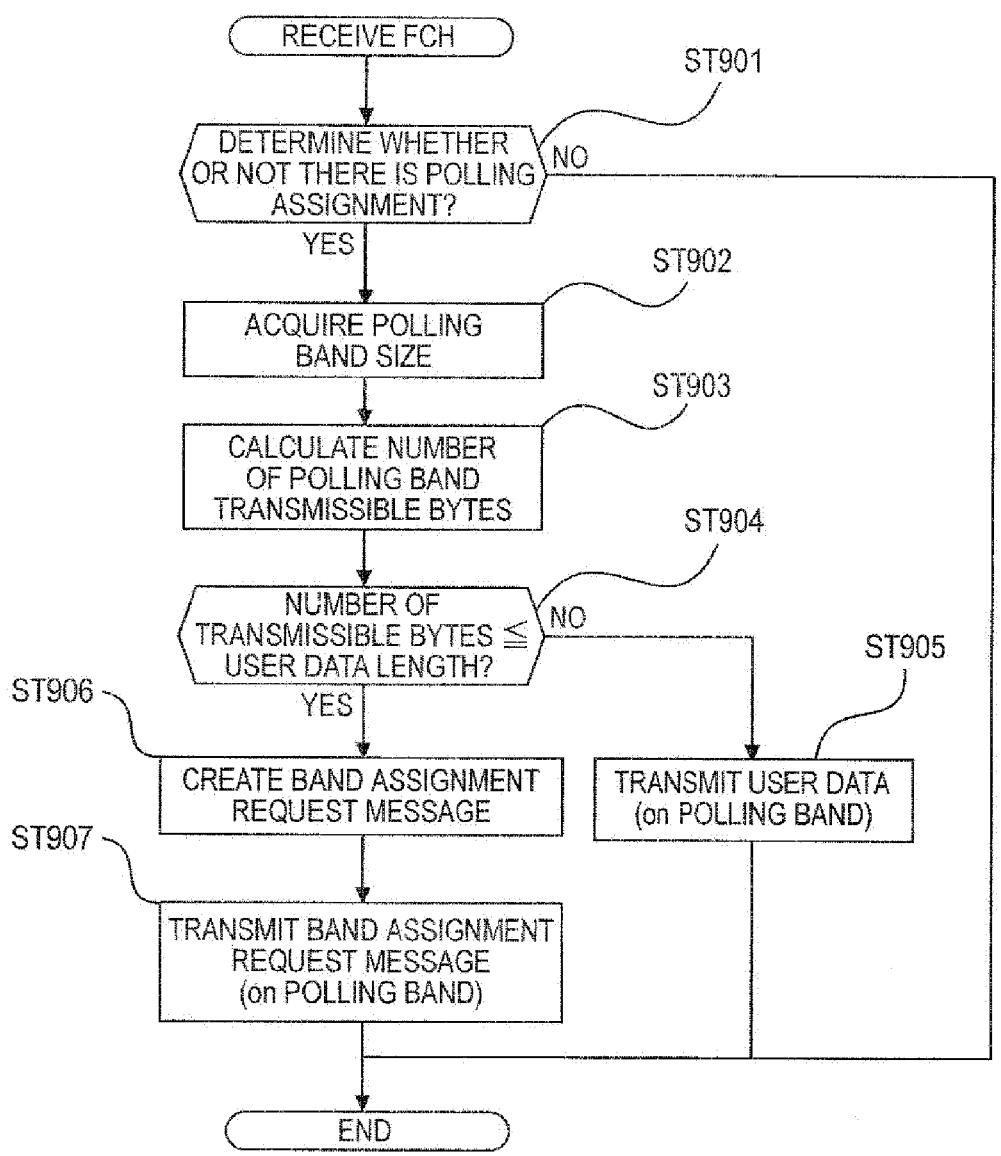

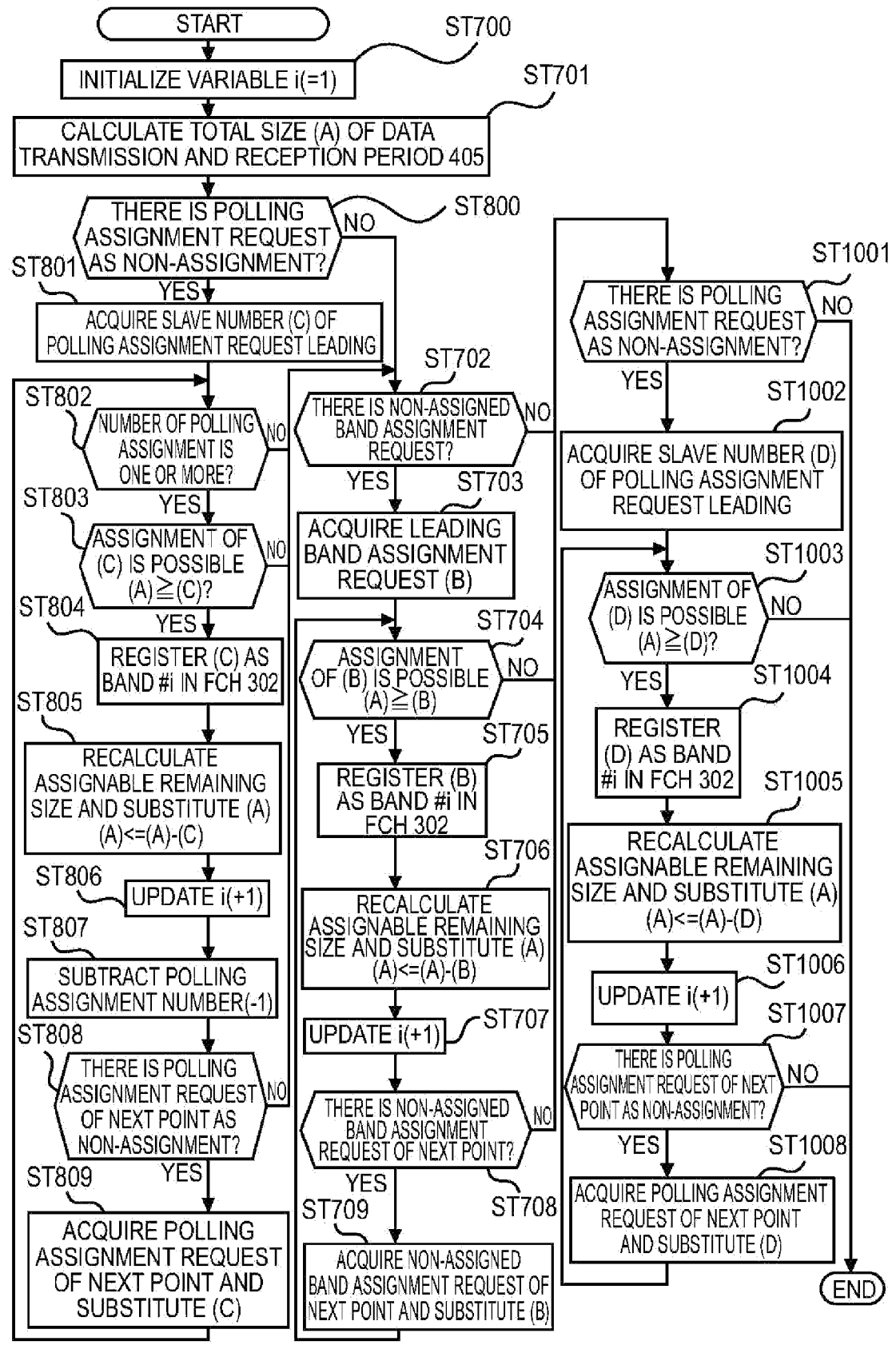

DATA TRANSMITTING AND RECEIVING METHOD, DATA TRANSMITTING AND RECEIVING SYSTEM, MASTER DEVICE, AND SLAVE DEVICE

TECHNICAL FIELD

The present invention relates to a data transmitting and receiving method, a data transmitting and receiving system, a master device, and a slave device in a network system in which a plurality of communication devices perform data transmission sharing the same medium such as high-speed PLC (Power Line Communication) and wireless LAN.

BACKGROUND ART

When a plurality of communication devices performs data transmission sharing the same medium such as wireless or high-speed PLC, it is necessary to perform control such that two or more communication devices do not perform data transmission to the same medium at the same timing. This is because, when two or more communication devices perform data transmission to the shared medium at the same timing, the transmitted data collide on the transmission path, the data are not separated in the reception devices, and thus communication fails.

Conversely, when the transmission access to the shared medium is extremely restricted, no communication device obtains access right to the shared medium even if there is a communication device having data and desiring the transmission access to the shared medium, and a state of disusing the shared medium continues, which is not preferable from the viewpoint of transmission efficiency. As a technique of controlling the access of this communication device to the shared medium, there is medium access control (MAC).

In addition, there is "low power data communication system/wide band mobile communication access system (HiSWANa)" (ARIB STD-T70), standardized as a radio communication standard including such a medium access control method, and the like.

Hereinafter, the medium access control employed in the HiSWANa standard will be briefly described. A system configuration of HiSWANa is based on a radio communication system including an access point (hereinafter, referred to as "AP") and a mobile device (hereinafter, referred to as "MT"), and employs a TDMA (Time Division Multiple Access) method in concentrated control of the AP. The TDMA method is a method of alternately sharing one frequency with a plurality of transmitters (AP and MT) for a short time each. In the HiSWANa standard, Broadcast CHannel (hereinafter, referred to as "BCH"), Frame CHannel (hereinafter, referred to as "FCH"), and Access Feedback CHannel (hereinafter, referred to as "ACH"), for network management are transmitted from the AP to each MT. Among them, the BCH is used to take time synchronization between AP and MT, and is used to perform network association request with respect to the AP after performing detection and reception of the BCH to establish time synchronization when a new MT is associated to the network. The MT completing the network association receives the FCH including schedule information of the data transmission timing and the data reception timing, measures timing according to band assignment for transmission and reception, and performs transmission and reception of data. Since the MT for which the access to the shared medium is allowed at a specific timing is limited to one device by the schedule information described in the FCH, data collision does not occur in the radio communication path that is the shared medium, medium access control is realized, and it is possible to secure stable communication.

As the TDMA method employed in the HiSWANa, the AP schedules the assignment of the transmission band with respect to the device (also including the AP itself) having the transmission data, reflects it to the FCH, and transmits it for an MT. Accordingly, the MT having the data to be transmitted requests the assignment of the transmission band to the AP, and thus the band can be assigned. A message for requesting the band by the MT is a band assignment request message, and the AP receives the message to check a transmission buffer state of each MT to schedule a band of a certain period so as to occupy a specific MT, and reflects it to the FCH that is the schedule information.

As described above, each MT has to transmit the band assignment request message to the AP using several bands in the same manner as transmission of user data. However, since the band scheduled for the FCH is scheduled for the first time after the band assignment request message is transmitted to the AP, the first band assignment request message cannot be transmitted. For this reason, in the HiSWANa, a Random CHannel (hereinafter, referred to as "RCH") band is separately provided. In the RCH band, since the access to the shared medium is allowed so as not to be controlled to the schedule of the AP by the FCH, the MT can transmit the band assignment request message to the AP at an arbitrary timing. However, since the RCH period is out of a target of the access control by the AP as described above, there is a case where the plurality of MTs transmits the band assignment request message at the same timing. In this case, collision of the transmission data may occur, and the data reception of the AP on the reception side may fail. For this reason, the MT transmitting the RCH receives the ACH of the next cycle, and has to detect whether the band assignment request message transmitted to the AP in the RCH band of the previous period is received by the AP or collision occurs on the transmission path and the reception in the AP fails.

The MT detecting that the RCH transmission of the previous cycle fails by the reception of the ACH stops the access to the shared medium at a random period, and then performs retransmission of the band assignment request message based on the RCH. This is a system for making the timing of performing the retransmission between the devices different to avoid the band assignment request message based on the RCH transmitted at the next time from colliding again between the colliding MTs, which is referred to as back-off control.

As for the demand assignment type of the access right (time slot) to the shared medium by the band assignment request from individual MTs such as HiSWANa described above, a new proposal is made from the viewpoint of improvement of utilization efficiency (transmission efficiency) of the shared medium. In PLT 1, collision occurrence frequency of RCH used for transmission of a band assignment request message for original control and ASsociation Control CHannel (ASCH) transmitted when a new MT is associated is monitored. When the collision occurrence frequency is equal to or less than a predetermined value, data transmission itself, and not a message for control, is made possible from an MT to an AP in the RCH to improve the line utilization efficiency.

CITATION LIST

[PTL 1] Japanese Unexamined Patent Application Publication No. 9-18441 (FIG. 2 and the description thereof)

SUMMARY OF INVENTION

Technical Problem

As the demand assignment type described above, the MT transmits the band assignment request message to the AP whenever there is the transmission data, and it is necessary to wait for assignment of the band. When the transmission of the band assignment request message is performed in the RCH, there is a possibility that the transmission of the band assignment request message fails by a collision caused by simultaneous transmission from the plurality of MTs. However, once the band of a direction from the MT to the AP is assigned to the FCH, the MT can transmit the next band assignment request message for user data transmission with user data with respect to the AP using the assigned band. In this case, there is no possibility of collision of the transmission message. As described above, the transmission based on the RCH is used only when there is no band assignment based on the FCH. Conversely, a case where the collision of the band assignment request message based on the RCH occurs may be in a state where a communication line is not used, since the band assignment request message does not reach the AP due to the collision of the RCH although there is a sufficient margin in the communication line without the band assignment based on the FCH. As the accommodation number of MTs with respect to one AP increases, the occurrence frequency of the situation of the simultaneous transmission and collision of the RCH becomes higher. To avoid such a situation, there is a method of increasing the transmission capacity on the RCH to allow the simultaneous transmission of the band assignment request message from the plurality of MTs. However, in such a case, the band which can be used for the user data transmission capable of performing access control by the FCH is subjected to pressure, and thus a problem of decreasing efficiency of the whole system newly occurs.

The invention has been made to solve the problem of the related art described above, and an object of the invention is to suppress the influence of the pressure on the data transmission band and to prevent the line utilization efficiency from decreasing while avoiding the signal collision on the RCH.

Solution to Problem

A data transmitting and receiving method of the invention is an improved data transmitting and receiving method in which a master device that schedules data transmission and reception of a network, a slave device that performs data transmission or data reception on the basis of schedule information periodically output from the master device, and a transmission path that connects the master device and the slave device are provided, the method, which is a demand assignment type, including, on a data transmission and reception network for data transmission and reception between the master device and the slave device: requesting a band for performing data transmission to the master device according to the retention amount of data to be transmitted to the master device by the slave device; scheduling the band requested from the slave device by the master device; and performing communication on the basis of schedule information of the master device by the slave device, wherein the master device schedules an occupancy band of a fixed size for requesting a band to the master device by the slave device with respect to a specific number of slave devices for each one cycle, and wherein the slave device waits for assignment of the occupancy band of the fixed size based on the schedule and performs message transmission of requesting a band for data transmission to the master device.

A data transmitting and receiving system of the invention is an improved data transmitting and receiving system, which is a demand assignment type, including: a master device that schedules data transmission and reception of a network; a slave device that performs data transmission or data reception on the basis of schedule information periodically output from the master device; and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, wherein the master device is a master device that schedules an occupancy band of a fixed size for requesting a band to the master device by the slave device with respect to a specific number of slave devices for each one cycle, and wherein the slave device is a slave device that waits for assignment of the occupancy band of the fixed size based on the schedule and performs message transmission of requesting a band for data transmission to the master device.

A master device used in the data transmitting and receiving system of the invention is an improved master device used in a data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, and wherein the master device schedules an occupancy band of a fixed size for requesting a band for data transmission to the master device by the slave device with respect to a specific number of slave devices for each one cycle.

A slave device used in the data transmitting and receiving system of the invention is an improved slave device used in the data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, and wherein the master device waits for assignment of an occupancy band of a fixed size for requesting a band for data transmission to the master device by the slave device with respect to a specific number of slave devices for each one cycle, and message transmission of requesting a band for data transmission to the master device is performed using the assigned occupancy band of the fixed size.

Advantageous Effects of Invention

According to the invention, there is provided a data transmitting and receiving method, in which a master device that schedules data transmission and reception of a network, a slave device that performs data transmission or data reception on the basis of schedule information periodically output from the master device, and a transmission path that connects the master device and the slave device are provided, the method, which is a demand assignment type, including, on a data transmission and reception network for data transmission and reception between the master device and the slave device: requesting a band for performing data transmission to the master device according to the retention amount of data to be transmitted to the master device by the slave device; scheduling the band requested from the slave device by the master device; and performing communication on the basis of schedule information of the master device by the slave device, wherein the master device schedules an occupancy band of a fixed size for requesting a band for data transmission to the master device by the slave device with respect to a specific number of slave devices for each one cycle, and wherein the slave device waits for assignment of the occupancy band of the fixed size based on the schedule and performs message transmission of requesting a band for data transmission to the master device. Accordingly, in the data transmitting and receiving method of a demand assignment type, collision of a band assignment request message from the slave device does not occur, and it is possible to prevent line utilization efficiency from decreasing.

According to the invention, there is provided a data transmitting and receiving system, which is a demand assignment type, including: a master device that schedules data transmission and reception of a network; a slave device that performs data transmission or data reception on the basis of schedule information periodically output from the master device; and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, wherein the master device is a master device that schedules an occupancy band of a fixed size for requesting a band to the master device by the slave device with respect to a specific number of slave devices for each one cycle, and wherein the slave device is a slave device that waits for assignment of the occupancy band of the fixed size based on the schedule and performs message transmission of requesting a band for data transmission to the master device. Accordingly, in the data transmitting and receiving system of a demand assignment type, collision of a band assignment request message from the slave device does not occur, and it is possible to prevent line utilization efficiency from decreasing.

According to the invention, there is provided a master device used in a data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, and wherein the master device schedules an occupancy band of a fixed size for requesting a band for data transmission to the master device by the slave device with respect to a specific number of slave devices for each one cycle. Accordingly, in the master device used in the data transmitting and receiving system of a demand assignment type, collision of a band assignment request message from the slave device does not occur, and it is possible to prevent line utilization efficiency from decreasing.

According to the invention, there is provided a slave device used in a data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, and wherein the master device waits for assignment of an occupancy band of a fixed size for requesting a band for data transmission to the master device by the slave device with respect to a specific number of slave devices for each one cycle, and message transmission of requesting a band for data transmission to the master device is performed using the assigned occupancy band of the fixed size. Accordingly, in the slave device used in the data transmitting and receiving system of a demand assignment type, collision of a band assignment request message from the slave device does not occur, and it is possible to prevent line utilization efficiency from decreasing.

Objects, characteristics, viewpoints, advantages, and the like of the invention other than the above description are further clarified by the following detailed description of the invention with reference to the drawings.

BRIEF DESCRIPTION OF DRAWINGS

FIG. 1 is a diagram illustrating an example of a network configuration common to Embodiments 1, 2, and 3 of the invention.

FIG. 2 is a diagram illustrating an example of a device configuration common to Embodiments 1, 2, and 3 of the invention.

FIG. 3 is a diagram illustrating an example of a frame configuration transmitted and received through a power line common to Embodiments 1, 2, and 3 of the invention.

FIG. 4 is a diagram illustrating an example of an FCH configuration in the frame transmitted and received through a power line common to Embodiments 1, 2, and 3 of the invention.

FIG. 5 is a diagram illustrating an example of a polling band assignment management table common to Embodiments 1, 2, and 3 of the invention.

FIG. 6 is a diagram illustrating an example of a frame configuration when the polling band is assigned to 2 units in Embodiment 1 of the invention.

FIG. 7 is a diagram illustrating an example of a schedule processing flow of a master device in a technique leading to the invention.

FIG. 8 is a diagram illustrating an example of a schedule processing flow of the master device in Embodiment 1 of the invention.

FIG. 9 is a diagram illustrating an example of transmission processing flow of a slave device in Embodiment 2 of the invention.

FIG. 10 is a diagram illustrating an example of schedule processing flow of a master device in Embodiment 3 of the invention.

DESCRIPTION OF EMBODIMENTS

Embodiment 1

FIG. 1 is a diagram illustrating an example of a high-speed PLC network system performing data transmission and reception according to Embodiment 1 of the invention.

In FIG. 1, Reference Numerals 101, 102, 103, and 104 denote PLC modems provided with an I/F for a PLC network, Reference Numeral 101 among these denotes a master device (corresponding to the AP of HiSWANa) managing the entire of the high-speed PLC network, and Reference Numerals 102, 103, and 104 denote slave devices (corresponding to the MT of HiSWANa) connected to the high-speed PLC.

The devices are connected to a power line 105 which is a common medium by a PLC I/F formed of a power supply outlet, and are connected to external devices such as a PC by an Ethernet (registered trademark) I/F.

An example of configurations of the master device and the slave devices is shown in FIG. 2. FIG. 2 shows an example of a case where the master device and the slave device have the same configuration.

In FIG. 2, each device of the master device and the slave devices is provided with a CPU 201 performing operation control of the whole device, a general-purpose memory 202 primarily storing transmission and reception data, connection information, schedule information, and the like, a data bass 203, a bridge 204, a MAC 205, and a PHY 206. In the MAC, a data connection processing unit performing a connection process of data at the time of data transmission and a data separating unit performing a separation process of data at the time of data reception are further connected to a power line 207 by the PLC I/F and to an external device 208 such as the PC by the Ethernet (registered trademark) I/F. The external device such as the PC is connected to the end of the Ethernet (registered trademark) I/F 208.

The configuration of the high-speed PLC network system shown in FIG. 1 shows an example of a system configuration to which the data transmitting and receiving method and the data transmitting and receiving device of the invention can be applied, does not limit the application of the data transmitting and receiving method and the data transmitting and receiving system, and can be applied to other network systems using wireless LAN or the like.

Next, FIG. 3 shows an example of data transmitted and received through the power line 207 of the PLC network system shown in FIG. 1.

In FIG. 3, a data string is repeated by a frame cycle with a regular length. In each frame cycle, channels for control of a BCH 301, a FCH 302, an ACH 303, and an RCH 304 are transmitted and received for each frame cycle assigned at fixed length time. The channel period for control is not covered by medium access control, and the BCH 301, the FCH 302, and the ACH 303 are transmitted by the master device and are received by all the slave devices, the RCH 304 is transmitted by the slave device and is received by the master device, and the access right is predetermined.

The data transmission and reception period 305 except for the period of the channel for control becomes the target of the medium access control since the transmission device and the reception device of the data transmission and reception are switched, and is a period of determining the transmission device and the reception device by performing a schedule according to a band request from each slave device by the master device.

FIG. 7 shows an example of a process flow of the schedule performed by the master device when realizing HiSWANa that is a technique in the course of reaching the invention. Before the description of a specific operation of Embodiment 1 of the invention, the schedule process performed by the master device will be described with reference to FIG. 7.

The master device performs the schedule process shown in FIG. 7 for each frame cycle, and performs creation of the FCH 302 on the basis of the schedule result. Although described later, the FCH 302 is a channel of the master device to notify all the slave devices of the schedule result.

When the schedule process is started, the master device calculates a length (a size of the data transmission and reception period 305) that is a target of the schedule (ST701). When the band size of the data transmission and reception period 305 is not changed in each frame cycle, it is calculated once at the time of driving the master device, it is stored in the general-purpose memory 202 or the like, and thus the calculation process for each frame cycle may be omitted.

Next, when one band assignment request received from the slave device is selected (ST703), the master device receives the band assignment request from the plurality of slave devices, the master device generally stores a plurality of band assignment requests, and selects the band performing assignment among them) and the band size necessary for the selected band assignment request is compared with the band size of the data transmission and reception period 305 (ST704), it is determined that assignment of the band assignment request is possible when the band size of the data transmission and reception period 305 is larger, the assignment is determined, and the assignment band is registered in the FCH 302 (ST703). In addition, one band assignment request is selected from the remaining band assignment requests (ST708 and ST709), and an assignable remaining size is calculated in order to determine whether or not the assignment is possible. This can be calculated as a remainder obtained by sequentially subtracting (ST706) the band size of the band assignment request determined for assignment from the band size of the data transmission and reception period 305.

The process cycle from the process ST704 to ST709 is repeated. When the assignable remaining size is shorter than that of the assignment of the band assignment request (ST704: No) or when the assignment of all the band assignment requests stored in the master device are completed (ST708: No), the schedule process in one frame period is ended.

In the process, the result of the schedule performed by the master device is reported to all the slave devices using the FCH 302.

FIG. 4 shows the schedule result reported through the FCH 302.

In FIG. 4, Reference Numeral 305 denotes a period of performing the medium access control by the schedule of the master device, and denotes a period (the data transmission and reception period) of transmitting and receiving the user data.

In FIG. 4, the data transmission and reception period is divided into N bands by the FCH, and each band is assigned to each slave. In this case, the FCH 302 for schedule result report continues to a preamble signal for discriminating channels, and is configured by repetition of each of the N bands such as a transmission device number 402, a reception device number 401, a band size 403, and a transmission start time 404.

In the high-speed PLC network system configured by the devices described above and the data frame, the master device first independently starts an operation at the time of starting a system operation. After starting of the operation, the master device simultaneously transmits the BCH 301 that is a reference for time synchronization of the network, the FCH 302 including the schedule information, and the ACH 303 according to an internal clock of the master device at a regular cycle (frame cycle).

Before the association of a slave device, when the network is formed of only the master device, the transmission and reception of data do not occur, and there is no band assignment in the schedule information of the FCH 302. In this case, the schedule process is ended by No in the process ST702 in the process flow shown in FIG. 7. In addition, in this case, random access transmission based on the RCH 304 from the slave device does not occur either.

Next, an operation of the slave device will be described.

The slave device introduced to the network managed by the master device first establishes time synchronization with the master device by search and reception of the BCH 301. Thereafter, the slave device performs an association request to the master device by the RCH 304.

More specifically, an association request message is transmitted by the RCH 304. When the master device receives the association request message by the RCH, a Random Access Result based on ACH="Success" is transmitted from the master device, and the slave device receives it and knows that the association in the network is allowed.

If Random Access Result="Fail" is reported, the slave device performs retransmission of the association request message by the RCH 304. In such a manner, the slave device introduced to the network receives the FCH 302 at the next time to acquire a data transmission timing and a data reception timing of each device that is the schedule information, and can perform the transmission and reception of data on the basis of the schedule information.

As a specific operation of the embodiment, the master device starts assigning a band (hereinafter, referred to as a polling band) of a fixed size in which the band assignment request message can be transmitted, with respect to the slave device introduced to the network. FIG. 8 shows a process flow of a schedule also including the polling band. In FIG. 8, the same number is given to the same process as that of FIG. 7, and the description thereof is omitted.

In FIG. 8, the master device starting the schedule process selects one polling assignment request (the master device creates and stores the same number of polling assignment requests as that of the slave devices connected to the master device). When the number of slave devices connected to the master device is 0, there is no polling assignment request. Accordingly, the assignment process of the polling band is immediately ended (ST800: No). After selecting the polling assignment request, it is confirmed whether or not there is a remaining number in the polling assignment number (ST802).

The polling assignment number is the number of slave devices assigning the polling band in one frame, and is a value predetermined in the master device at the time of operating the master device.

After the assignment completion of the polling band for the number determined as the polling assignment number (ST802: No), a normal schedule process requested for assignment from the slave is started (ST702 onwards).

When there is the remaining number in the polling assignment number (ST802: Yes), the polling band and the data transmission and reception period 305 are compared in band sizes (ST803). When the band size of the data transmission and reception period 305 is larger, it is determined that the assignment of the band assignment request is possible, the assignment is determined, and the assignment is registered in the FCH 302 (ST804).

The processes ST805 and ST806 are equivalent to the processes ST706 and ST707, except that the polling assignment request is the process target.

In addition, since the polling band assignment is determined in one slave device in the process ST804, the polling assignment number is subjected to subtraction of 1 (ST807), and the next polling band assignment request is selected (ST808 and ST809). These are equivalent in process contents to the processes ST708 and ST709, except that the polling assignment request is the process target.

When the process cycle from the process ST802 to ST809 is repeated and there is no remaining number in the polling assignment number (ST802: No), when the assignable remaining size is shorter than that of the assignment of the polling band (ST803: No), and when the assignment of the polling band is completed for all the slave devices (ST808: No), the normal schedule process requested for assignment from the slave is started (ST702 onwards).

Herein, the selection of the polling assignment request will be described in more detail. For example, when the polling assignment number is 2 and there are 3 slave devices introduced to the network as shown in FIG. 1, sequentially, the slave device (#1) 102 and the slave device (#2) 103 become the polling assignment target slaves at the frame cycle 1, the slave device (#3) 104 and the slave device (#1) 102 become the polling assignment target slaves at the frame cycle 2, and the slave device (#2) 103 and the slave device (#3) 104 become the polling assignment target slaves at the frame cycle 3.

FIG. 5 shows a state where M slave devices are introduced to the network, and shows an example of a table storing the polling assignment requests in the master device while setting the polling assignment number as 2, and the table is stored in the general-purpose memory 202 or the like.

The result of the schedule performed as described above is shown in FIG. 6.

In FIG. 6, two bands for two slave devices are assigned to the band 601 as a polling band only for band assignment request message transmission, and the remaining band 602 is a data transmission and reception period. For this reason, in the FCH 302, a band #1 (603) and a band #2 (604) are written as transmission device=slave device and reception device=master device.

In the scheduling of the frame cycle 1 shown in FIG. 5, the polling band assignment of the slave device (#1) 501 registered in the leading of the table and the slave device (#2) 502 is determined and two slave devices move to the end of the table as a state where the assignment is completed, thereby updating the table.

In the same manner, in the frame cycle 2 and the frame cycle 3, the assignment of the polling band is scheduled for two slave devices registered in the leading of the table, they similarly move to the end of the table, thereby updating the table. Accordingly, the assignment of the polling band is performed while keeping the balance between the slave devices of the number of the polling band assignment times.

When such a network is configured, a case of transmitting the user data from the external device 107 to the external device 106 will be described.

The user data input from the external device 107 to the slave device (#1) 102 is transmitted to the external device 106 through the power line 105 and the master device 101. In this case, when it is transmitted from the slave device (#1) to the master device 101, the access right to the power line 105 is managed by the master device 101. Accordingly, the slave device (#1) 102 transmits the band assignment request message to the master device 101, waits for the band assignment based on the FCH 302, and performs the user data transmission on the master device. When the band assignment request message is transmitted and there is a device number of the slave device in the transmission device number 402 of the schedule information of the FCH 302 including the polling band, it is possible to transmit the band assignment request message using the assignment band.

In the data transmission and reception period, all of the slave devices perform transmission and reception according to the schedule information. Accordingly, there is no possibility that the band assignment request message transmitted in the data transmission and reception period collides with the user data or the band assignment request message transmitted from the other slave and is not transmitted to the master device. However, there is a possibility that a band assignment request message is not transmitted to the master device by external noise on the power line 105, but this is not a problem to be solved by the invention.

Meanwhile, the slave device having no device number thereof in the transmission device number 402 of the schedule information of the FCH 302 performs transmission of the band assignment request message with respect to the master device in the period of RCH 304 in the related example. However, the period of the RCH 304 is not covered by the medium access control, and each slave device may perform transmission at the timing of each device. When the plurality of slave devices perform the band assignment request message transmission in the period of the RCH 304 of the same frame cycle, the collision of the transmission data occurs and the band assignment message is not transmitted to the master device.

For this reason, the slave device in the system of the invention does not perform the transmission of the band assignment request message in the period of the RCH 304, waits for the polling band assignment, and performs the transmission of the band assignment request message in the period of the polling band.

In Embodiment 1 described above, the band assignment request message transmission based on the RCH is not performed, and the collision caused by the transmission from the plurality of slave devices does not occur. For this reason, it is not necessary to provide a transmission stop period (back-off period) for RCH transmission control, and thus it is possible to improve a utilization rate (transmission efficiency) of the shared medium. This can solve the problem that the collision of the RCH frequently occurs when the accommodation number of slave devices increases and the transmission efficiency of the whole system deteriorates.

Embodiment 2

FIG. 9 is a transmission process flowchart in the slave device 102 of the embodiment, and a basic device and a system configuration are the same as those of Embodiment 1.

The slave device in Embodiment 2 may be subjected to the assignment of the polling band in the same manner as Embodiment 1. Accordingly, when the user data to be transmitted is kept, the schedule information is acquired from the FCH 302, and it is determined whether or not there is the polling band assignment of the slave device (ST901). When there is no polling band assignment, the polling band assignment after the next frame cycle is awaited in the same manner as Embodiment 1 and the transmission and reception process in the frame cycle is ended.

When the assignment of the polling band is detected by the FCH 302, the assignment band size is further acquired from the schedule information in the polling band (ST902), and a data length which can be transmitted in the assignment band size is calculated (ST903). Then, the data length which can be transmitted in the polling band is compared with the user data length to be received from the external device 107 and transmitted to the master device 101 through the power line 105 (ST904). In this case, when the data length which can be transmitted in the polling band is equal to or greater than the user data length, the transmission of the user data is performed using the polling band (ST905), and the transmission operation in the frame cycle is ended.

When the data length which can be transmitted in the polling band is less than the user data length, the band assignment request message for requesting assignment of the band necessary for the user data transmission to the master device 101 is created (ST906), and it is transmitted to the master device 101 using the polling band (ST907).

The master device 101 receiving the band assignment request message transmitted from the slave device 102 to the master device 101 using the polling band schedules the assignment of the band requested in the next frame cycle, and reports it to the slave device 102 using the FOR 302. The slave device 102 receives the band requested for the assignment by the band assignment request message in the next frame cycle and later, and performs transmission of the user data using the band.

In Embodiment 2 described above, the assignment polling band is used for every several frame cycles, and the transmission of the user data is performed if possible. Accordingly, the user data transmission is possible without transmission and reception of the band assignment request message, a protocol delay (a delay while the band assignment request message is transmitted and the assignment is awaited) caused by the user data transmission through the power line is reduced, and thus it is possible to improve the transmission efficiency.

Embodiment 3

FIG. 10 shows a specific schedule process flow of the embodiment. In the embodiment, a basic device and a system configuration are the same as those of Embodiment 1, and thus the description thereof is omitted. As for the process flow, the same number is given to the same process as that of FIG. 8, and the description thereof is omitted.

The master device in Embodiment 3 performs the assignment of the polling band with respect to the number of devices designated by the polling assignment number from the slave device introduced to the network in the same manner as Embodiment 1, and further schedules the assignment of the band requested for assignment from the slave device.

The completion of the assignment of the band requested for assignment from the slave device is the same when the assignment request is never received from the slave device (ST702: No), when the assignable remaining size is shorter than that of the assignment of a new band assignment request (ST704: No), or when all the band assignment requests received from the slave device and stored by the master device become a state where the assignment is completed (ST708: No). In Embodiment 1, the schedule process is ended in this state, but in Embodiment 3, a schedule flow of the polling band is further added (ST1001 to ST1008). In the frame cycle 2 shown in FIG. 5, the polling band assignment of the slave device (#1) 501 and the slave device (#2) 502 is determined, and the polling band non-assignment state of the slave device (#3) 503, the slave device (#4) 504, and the slave device (#5) 505 is compared with the assignable remaining size. When the assignment of the polling band is further possible, the polling band assignment is also performed on the slave device (#3) 503, the slave device (#4) 504, and the slave device (#5) 505.

A specific process flow of the embodiment will be described with reference to FIG. 10.

Existence of the non-assigned polling assignment request is confirmed by the polling assignment request (ST1001), this is selected (ST1002), and it is determined whether or not the polling band assignment is possible in comparison with the assignable remaining size (ST1003). When the assignment is possible, the same processes ST1004 to ST1006 as the processes ST804 to ST806 are performed.

In addition, the process ST807 shown in FIG. 8 is omitted, and the same processes ST1007 and ST1008 as the processes ST808 and ST809 are performed. The reason why the process corresponding to the process ST807 is not performed is because the polling band assignment to the slave device corresponding to the number of devices designated as the polling assignment number has been already completed and the remaining assignment of the polling band is performed.

The process cycle from the process ST1001 to ST1008 is repeated. When the assignable remaining size is shorter than that of the assignment of the polling band (ST1003: No), or when the polling band assignment is completed for all the slave devices (ST1007: No), the schedule process in one frame period is ended.

In Embodiment 3 described above, the assignment of the assignment request based on the polling assignment number and the band assignment request message is performed in the data transmission and reception period 305. When there is still a remainder, the polling assignment is additionally performed. Accordingly, for example, in FIG. 5 of Embodiment 1, the slave device (#3) and the slave device (#4) waiting for the assignment of the polling band in the frame cycle 3 may be subjected to the assignment of the polling band in the frame cycle 2. Therefore, it is possible to more immediately transmit the band assignment request message from the slave device to the master device. Accordingly, the communication delay of waiting for the assignment of the polling band is reduced, and thus it is possible to improve the transmission efficiency.

Embodiments 1 to 3 are as described above, and have the following characteristics in summary of a superordinate concept.

Characteristic 1: A demand assignment type in which a master device (corresponding to AP) that schedules data transmission and reception of a network, a slave device (corresponding to MT) that performs data transmission or data reception on the basis of schedule information periodically output from the master device, and a transmission path that connects the master device and the slave device are provided, the method, which is a demand assignment type, including, on a data transmission and reception network for data transmission and reception between the master device and the slave device: requesting a band for performing data transmission to the master device according to the retention amount of data to be transmitted to the master device by the slave device; scheduling the band requested from the slave device by the master device; and performing communication on the basis of schedule information of the master device by the slave device, wherein in an occupancy band for transmitting a band assignment request message requesting a band to the master device by the slave device, irrespective of the retention amount of the slave device, the master device schedules assignment of the occupancy band for requesting a band to a specific number of slave devices for each one cycle, and the slave device waits for assignment of the occupancy band for requesting a band and transmits the band assignment request message, thereby requesting the band for data transmission to the master device.

Characteristic 2: Further, it is determined whether or not the data of the slave device can be transmitted in the periodically assigned occupancy band of the fixed size, and the data is transmitted in the occupancy band of the fixed size when it can be transmitted.

Characteristic 3: Further, the occupancy band of the fixed size is assigned to the specific number of slave devices, further, all the bands requested for assignment by the band assignment request message from the slave device are assigned, further, when a non-assigned band remains, and when the remaining band is equal to or greater than the occupancy band of the fixed size, the occupancy band assignment of the fixed size is also performed on the slave device other than the specific number of slave devices, and thus the frequency of occupancy band assignment of the fixed size is raised when the transmission path is empty.

Characteristic 4: When the accommodation number of MTs with respect to one AP is increased to 2 or more, it is possible to avoid the collision occurrence of the band assignment request message using the RCH which may occur in the related art, and thus it is possible to raise the utilization rate (transmission efficiency) of the shared medium by excluding the communication stop time caused by back-off control.

Characteristic 5: Further, after the slave device is introduced to the network, the master device assigns a band which can be occupied for transmission by the slave device for every several frames without transmitting the band assignment request message from the slave device to the master device, the slave device transmits the band assignment request message requesting band assignment for user data transmission in a band which can be occupied, the slave device transmits the user data in the band for transmission which can be occupied when it is determined that the size of the user data is small and the user data can be transmitted in the band for transmission which can be occupied, it is possible to transmit the band assignment request message and to reduce a protocol delay needing a plurality of frame cycles such as assignment of the band, and it is possible to improve the latency time in the user data transmission from the slave device to the master device.

Characteristic 6: Further, when there is no band assignment request from the slave device and the non-assigned band occurs, the master device increases the number of slave devices for the assignment of a band for transmission which can be occupied, whereby it is possible to shorten the waiting time until the slave device can transmit the band assignment request message, and thus it is possible to improve the latency time in the user data transmission from the slave device to the master device.

Characteristic 7: A data transmitting and receiving method in which a master device that schedules data transmission and reception of a network, a slave device that performs data transmission or data reception on the basis of schedule information periodically output from the master device, and a transmission path that connects the master device and the slave device are provided, the method, which is a demand assignment type, including, on a data transmission and reception network for data transmission and reception between the master device and the slave device: requesting a band for performing data transmission to the master device according to the retention amount of data to be transmitted to the master device by the slave device; scheduling the band requested from the slave device by the master device; and performing communication on the basis of schedule information of the master device by the slave device, wherein the master device schedules an occupancy band of a fixed size for requesting a band to the master device by the slave device with respect to a specific number of slave devices for each one cycle, and wherein the slave device waits for assignment of the occupancy band of the fixed size based on the schedule and performs message transmission of requesting a band for data transmission to the master device.

Characteristic 8: A data transmitting and receiving method according to Characteristic 7, wherein when data of the slave device can be transmitted in the periodically assigned occupancy band of the fixed size, the data is transmitted in the occupancy band of the fixed size.

Characteristic 9: A data transmitting and receiving method in which a master device that schedules data transmission and reception of a network, a slave device that performs data transmission or data reception on the basis of schedule information periodically output from the master device, and a transmission path that connects the master device and the slave device are provided, the method, which is a demand assignment type, including, on a data transmission and reception network for data transmission and reception between the master device and the slave device: requesting a band for performing data transmission to the master device according to the retention amount of data to be transmitted to the master device by the slave device; scheduling the band requested from the slave device by the master device; and performing communication on the basis of schedule information of the master device by the slave device, wherein the master device schedules an occupancy band of a fixed size for requesting a band to the master device by the slave device with respect to a specific number of slave devices for each one cycle, and wherein the slave device waits for assignment of the occupancy band of the fixed size based on the schedule, and transmits the data in the occupancy band of the fixed size when data of the slave device can be transmitted in the periodically assigned occupancy band of the fixed size.

Characteristic 10: The data transmitting and receiving method according to any one of Characteristics 7 to 9, wherein the schedule of the occupancy band of the fixed size of the master device is performed irrespective of the retention amount of data of the slave device.

Characteristic 11: The data transmitting and receiving method according to any one of Characteristics 7 to 10, wherein even after assignment of the occupancy band of the fixed size for the specific number of slave devices is performed by the master device and assignment of the band for which assignment is requested from the slave device is further performed, when an unassigned band still remains and the remaining band is equal to or greater than the occupancy band of the fixed size, the occupancy band assignment of the fixed size is also performed on slave devices more than the specific number of slave devices.

Characteristic 12: A data transmitting and receiving system, which is a demand assignment type, including: a master device that schedules data transmission and reception of a network; a slave device that performs data transmission or data reception on the basis of schedule information periodically output from the master device; and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, wherein the master device is a master device that schedules an occupancy band of a fixed size for requesting a band to the master device by the slave device with respect to a specific number of slave devices for each one cycle, and wherein the slave device is a slave device that waits for assignment of the occupancy band of the fixed size based on the schedule and performs message transmission of requesting a band for data transmission to the master device.

Characteristic 13: The data transmitting and receiving system according to Characteristic 12, wherein when data of the slave device can be transmitted in the periodically assigned occupancy band of the fixed size, the data is transmitted in the occupancy band of the fixed size.

Characteristic 14: A data transmitting and receiving method, in which a data transmitting and receiving system which is a demand assignment type, includes: a master device that schedules data transmission and reception of a network; a slave device that performs data transmission or data reception on the basis of schedule information periodically output from the master device; and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, wherein the master device is a master device that schedules an occupancy band of a fixed size for requesting a band to the master device by the slave device with respect to a specific number of slave devices for each one cycle, and wherein the slave device is a slave device that waits for assignment of the occupancy band of the fixed size based on the schedule, and transmits the data in the occupancy band of the fixed size when data of the slave device can be transmitted in the periodically assigned occupancy band of the fixed size.

Characteristic 15: The data transmitting and receiving system according to any one of Characteristics 12 to 14, wherein the schedule of the occupancy band of the fixed size of the master device is performed irrespective of the retention amount of data of the slave device.

Characteristic 16: The data transmitting and receiving system according to any one of Characteristics 12 to 15, wherein even after assignment of the occupancy band of the fixed size for the specific number of slave devices is performed by the master device and assignment of the band for which assignment is requested from the slave device is further performed, when an unassigned band still remains and the remaining band is equal to or greater than the occupancy band of the fixed size, the master device also performs the occupancy band assignment of the fixed size on slave devices more than the specific number of slave devices.

Characteristic 17: A master device used in a data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, and wherein the master device schedules an occupancy band of a fixed size for requesting a band for data transmission to the master device by the slave device with respect to a specific number of slave devices for each one cycle.

Characteristic 18: The master device according to Characteristic 17, wherein when data of the slave device can be transmitted in the periodically assigned occupancy band of the fixed size, the data is transmitted in the occupancy band of the fixed size from the slave device.

Characteristic 19: A master device used in a data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, and wherein the master device schedules an occupancy band of a fixed size for requesting a band for data transmission to the master device by the slave device with respect to a specific number of slave devices for each one cycle.

Characteristic 20: The master device according to any one of Characteristics 17 to 19, wherein the schedule of the occupancy band of the fixed size of the master device is performed irrespective of the retention amount of data of the slave device.

Characteristic 21: The master device according to any one of Characteristics 17 to 20, wherein even after assignment of the occupancy band of the fixed size for the specific number of slave devices is performed and assignment of the band for which assignment is requested from the slave device is further performed, when an unassigned band still remains and the remaining band is equal to or greater than the occupancy band of the fixed size, the occupancy band assignment of the fixed size is also performed on slave devices more than the specific number of slave devices.

Characteristic 22: A slave device used in a data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, and wherein the master device waits for assignment of an occupancy band of a fixed size for requesting a band for data transmission to the master device by the slave device with respect to a specific number of slave devices for each one cycle, and message transmission of requesting a band for data transmission to the master device is performed using the assigned occupancy band of the fixed size.

Characteristic 23: The slave device according to Characteristic 22, wherein when data of the slave device can be transmitted in the periodically assigned occupancy band of the fixed size, the data is transmitted in the occupancy band of the fixed size.

Characteristic 24: A slave device used in a data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein on a data transmission and reception network for data transmission and reception between the master device and the slave device, the slave device requests a band for performing data transmission to the master device according to the retention amount of data to be transmitted to the master device, the master device schedules the band requested from the slave device, and the slave device performs communication on the basis of schedule information of the master device, and wherein the master device waits for assignment of an occupancy band of a fixed size for requesting a band for data transmission to the master device by the slave device with respect to a specific number of slave devices for each one cycle, and when data thereof can be transmitted in the periodically assigned occupancy band of the fixed size, the data is transmitted in the occupancy band of the fixed size.

Characteristic 25: The slave device according to any one of Characteristics 22 to 24, wherein the schedule of the occupancy band of the fixed size is a schedule performed irrespective of the retention amount of the data thereof.

Characteristic 26: The slave device according to any one of Characteristics 22 to 25, wherein the occupancy band of the fixed size is an occupancy band of a fixed size in which even after assignment of the occupancy band of the fixed size for the specific number of slave devices is performed by the master device and assignment of the band for which assignment is requested from the slave device is further performed, when an unassigned band still remains and the remaining band is equal to or greater than the occupancy band of the fixed size, the assignment is also performed on slave devices more than the specific number of slave devices.

The invention claimed is:

1. A data transmitting and receiving method in which a master device that schedules data transmission and reception of a network, a slave device that performs data transmission or data reception on the basis of schedule information periodically output from the master device, and a transmission path that connects the master device and the slave device are provided, the method, which is a demand assignment type, comprising, on a data transmission and reception network for data transmission and reception between the master device and the slave device:

transmitting, by the slave device to the master device, a request to be associated in the data transmission and reception network, allowing, by the master device, the association of the slave device into the data transmission and reception network, scheduling, by the master device, a polling band of a fixed size for requesting a data transmission band by the slave device with respect to a specific number of slave devices for each one cycle, transmitting, to the master device by the slave device, within a polling band assigned to the slave device, a request for a data transmission band for performing data transmission to the master device according to a retention amount of data to be transmitted to the master device by the slave device;

scheduling the data transmission band requested from the slave device by the master device; and performing communication in the scheduled data transmission band by the slave device.

2. The data transmitting and receiving method according to claim 1, wherein when data of the slave device can be transmitted in the periodically assigned polling band of the fixed size, the data is transmitted in the polling band of the fixed size.

3. The data transmitting and receiving method according to claim 2, wherein the scheduling of the polling band of the fixed size by the master device is performed irrespective of the retention amount of data of the slave device.

4. The data transmitting and receiving method according to claim 3, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

5. The data transmitting and receiving method according to claim 2, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

6. The data transmitting and receiving method according to claim 1, wherein the scheduling of the polling band of the fixed size by the master device is performed irrespective of the retention amount of data of the slave device.

7. The data transmitting and receiving method according to claim 6, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

8. The data transmitting and receiving method according to claim 1, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

9. A data transmitting and receiving method in which a master device that schedules data transmission and reception of a network, a slave device that performs data transmission or data reception on the basis of schedule information periodically output from the master device, and a transmission path that connects the master device and the slave device are provided, the method, which is a demand assignment type, comprising, on a data transmission and reception network for data transmission and reception between the master device and the slave device:

transmitting, by the slave device to the master device, a request to be associated in the data transmission and reception network, allowing, by the master device, the association of the slave device into the data transmission and reception network, scheduling, by the master device, a polling band of a fixed size for requesting a data transmission band by the slave device with respect to a specific number of slave devices for each one cycle, transmitting, to the master device by the slave device, a retention amount of data within a polling band assigned to the slave device, when the data can be transmitted within the polling band assigned to the slave device, and when the retention amount of data cannot be transmitted within the polling band assigned to the slave device, transmitting, to the master device by the slave device, within the polling band assigned to the slave device, a request for a data transmission band for performing data transmission to the master device according to the retention amount of data to be transmitted to the master device by the slave device, scheduling the data transmission band requested from the slave device by the master device; and performing communication in the scheduled data transmission band by the slave device.

10. The data transmitting and receiving method according to claim 9, wherein the scheduling of the polling band of the fixed size by the master device is performed irrespective of the retention amount of data of the slave device.

11. The data transmitting and receiving method according to claim 10, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

12. The data transmitting and receiving method according to claim 9, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

13. A data transmitting and receiving system, which is a demand assignment type, comprising:
a master device that schedules data transmission and reception of a network;
a slave device that performs data transmission or data reception on the basis of schedule information periodically output from the master device; and
a transmission path that connects the master device and the slave device,
wherein the slave device is configured to request the master device to be associated in the network via a control channel,
the master device is configured to allow the association of the slave device into the data transmission and reception network,
the master device is configured to schedule a polling band of a fixed size for requesting a data transmission band by the slave device with respect to a specific number of slave devices for each one cycle,
the slave device is configured to transmit, within a polling band assigned to the slave device, a request for a data transmission band for performing data transmission to the master device, according to a retention amount of data to be transmitted to the master device,
the master device is configured to schedule the data transmission band requested from the slave device, and
the slave device is configured to perform communication in the scheduled data transmission band.

14. The data transmitting and receiving system according to claim 13, wherein when data of the slave device can be transmitted in the periodically assigned polling band of the fixed size, the data is transmitted in the polling band of the fixed size.

15. The data transmitting and receiving system according to claim 14, wherein the scheduling of the polling band of the fixed size of the master device is performed irrespective of the retention amount of data of the slave device.

16. The data transmitting and receiving system according to claim 15, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

17. The data transmitting and receiving system according to claim 14, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

18. The data transmitting and receiving system according to claim 13, wherein the scheduling of the polling band of the fixed size of the master device is performed irrespective of the retention amount of data of the slave device.

19. The data transmitting and receiving system according to claim 18, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

20. The data transmitting and receiving system according to claim 13, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

21. A data transmitting and receiving system, which is a demand assignment type, comprising:
a master device that schedules data transmission and reception of a network;
a slave device that performs data transmission or data reception on the basis of schedule information periodically output from the master device; and
a transmission path that connects the master device and the slave device,
wherein the slave device is configured to request the master device to be associated in the data transmission and reception network via a control channel,
the master device is configured to allow the association of the slave device into the data transmission and reception network,
the master device is configured to schedule a polling band of a fixed size for requesting a data transmission band by the slave device with respect to a specific number of slave devices for each one cycle, and
the slave device is configured to transmit a retention amount of data to the master device, within a polling band assigned to the slave device, when the data can be transmitted within the polling band assigned to the slave device, and transmit, within a polling band assigned to the slave device, when the data cannot be transmitted within the polling band assigned to the slave device, a request for a data transmission band for performing data transmission to the master device, according to the retention amount of data to be transmitted to the master device,
the master device is configured to schedule the data transmission band requested from the slave device, and
the slave device is configured to perform communication in the scheduled data transmission band.

22. The data transmitting and receiving system according to claim 21, wherein the scheduling of the polling band of the fixed size of the master device is performed irrespective of the retention amount of data of the slave device.

23. The data transmitting and receiving system according to claim 22, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

24. The data transmitting and receiving system according to claim 21, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

25. A master device used in a data transmitting and receiving system, which is a demand assignment type, wherein the master device schedules data transmission and reception of a network, a slave device performs data transmission or data reception on the basis of schedule information periodically output from the master device, and a transmission path that connects the master device and the slave device, wherein the master device is configured to:
  receive a request to be associated in the network, from the slave device, via a control channel,
  allow the association of the slave device into the network,
  schedule a polling band of a fixed size for the slave device to request a data transmission band for data transmission with respect to a specific number of slave devices for each one cycle,
  receive, within the polling band assigned to the slave device, a request from the slave device for a data transmission band for performing data transmission to the master device according to a retention amount of data to be transmitted to the master device by the slave device,
  schedule the data transmission band requested from the slave device, and
  communicate with the slave device in the scheduled data transmission band.

26. The master device according to claim 25, wherein when data of the slave device can be received by the master device in the periodically assigned polling band of the fixed size, the data is received by the master device in the occupancy band of the fixed size from the slave device.

27. The master device according to claim 26, wherein the scheduling of the polling band of the fixed size by the master device is performed irrespective of the retention amount of data of the slave device.

28. The master device according to claim 27, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

29. The master device according to claim 26, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

30. The master device according to claim 25, wherein the scheduling of the polling band of the fixed size by the master device is performed irrespective of the retention amount of data of the slave device.

31. The master device according to claim 30, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

32. The master device according to claim 25, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

33. A master device used in a data transmitting and receiving system, which is a demand assignment type, wherein the master device schedules data transmission and reception of a network, a slave device performs data transmission or data reception on the basis of schedule information periodically output from the master device, and a transmission path that connects the master device and the slave device, wherein the master device is configured to:
  receive a request to be associated in the network, from the slave device, via a control channel,
  allow the association of the slave device into the network,
  schedule a polling band of a fixed size for the slave device to request a data transmission band for data transmission with respect to a specific number of slave devices for each one cycle,
  receive, within the polling band assigned to the slave device, a retention amount of data from the slave device, when the data can be received within the polling band assigned to the slave device, and when the data cannot be received within the polling band assigned to the slave device, receiving a request from the slave device, within the polling band assigned to the slave device, for a data transmission band for performing data transmission to the master device according to the retention amount of data to be transmitted to the master device by the slave device,
  schedule the data transmission band requested from the slave device, and
  communicate with the slave device in the scheduled data transmission band.

34. The master device according to claim 33, wherein the scheduling of the polling band of the fixed size by the master device is performed irrespective of the retention amount of data of the slave device.

35. The master device according to claim 34, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

36. The master device according to claim 33, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

37. A slave device used in a data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein the slave device is configured to:
- transmit a request to be associated in the network, to the master device, via a control channel,
- receive acknowledgement from the master device of allowed association into the network,
- receive a schedule including a polling band of a fixed size for the slave device to request a data transmission band for data transmission to the master device with respect to a specific number of slave devices for each one cycle,
- transmit, within the polling band assigned to the slave device, a request for a data transmission band for performing data transmission to the master device according to the retention amount of data to be transmitted to the master device,
- receive a schedule assigning the data transmission band requested from the slave device, from the master device, and
- performing communication in the scheduled data transmission band.

38. The slave device according to claim 37, wherein when data of the slave device can be transmitted in the periodically assigned polling band of the fixed size, the data is transmitted in the polling band of the fixed size.

39. The slave device according to claim 38, wherein the scheduling of the polling band of the fixed size is performed irrespective of the retention amount of the retention amount of data.

40. The slave device according to claim 39, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

41. The slave device according to claim 38, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

42. The slave device according to claim 37, wherein the scheduling of the polling band of the fixed size is performed irrespective of the retention amount of the retention amount of data.

43. The slave device according to claim 42, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

44. The slave device according to claim 37, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

45. A slave device used in a data transmitting and receiving system, which is a demand assignment type, including a master device that schedules data transmission and reception of a network, a slave device that performs data transmission or data reception on the basis of schedule information periodically output from the master device, and a transmission path that connects the master device and the slave device, wherein the slave device is configured to:
- transmit a request to be associated in the network, to the master device, via a control channel,
- receive acknowledgement from the master device of allowed association into the network,
- receive a schedule including a polling band of a fixed size for the slave device to request a data transmission band for data transmission to the master device with respect to a specific number of slave devices for each one cycle,
- transmit, within the polling band assigned to the slave device, a retention amount of data, when the data can be transmitted within the polling band assigned to the slave device, and when the data cannot be transmitted within the polling band assigned to the slave device, transmitting a request, within the polling band assigned to the slave device, to the master device, for a data transmission band for performing data transmission to the master device according to the retention amount of data to be transmitted to the master device,
- receive a schedule assigning the data transmission band requested from the slave device, from the master device, and
- performing communication in the scheduled data transmission band.

46. The slave device according to claim 45, wherein the scheduling of the polling band of the fixed size is performed irrespective of the retention amount of the retention amount of data.

47. The slave device according to claim 46, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

48. The slave device according to claim 45, wherein when an unassigned band still remains, even after assignment of the polling band of the fixed size for the specific number of slave devices and assignment of the data transmission band requested from the slave device are performed by the master device, and the remaining band is equal to or greater than the fixed size of the polling band, the polling band assignment of the fixed size is allocated for more slave devices other than the specific number of slave devices.

* * * * *